US012587049B2

(12) United States Patent
Shih et al.

(10) Patent No.: US 12,587,049 B2
(45) Date of Patent: Mar. 24, 2026

(54) SYNCHRONOUS RELUCTANCE MOTOR WITH MAGNETIC FLUX BARRIERS

(71) Applicant: Nidec Corporation, Kyoto (JP)

(72) Inventors: Pei-Chun Shih, Taipei City (TW); Ta-Yin Luo, Taipei City (TW); Kuan Yang, Taipei City (TW); Sheng-Chan Yen, Taipei City (TW); Guo-Jhih Yan, Taipei City (TW); Cheng-Tsung Liu, Kaohsiung (TW)

( * ) Notice: Subject to any disclaimer, the term of this patent is extended or adjusted under 35 U.S.C. 154(b) by 107 days.

(21) Appl. No.: 18/535,057

(22) Filed: Dec. 11, 2023

(65) Prior Publication Data

US 2024/0396389 A1     Nov. 28, 2024

(30) Foreign Application Priority Data

Dec. 14, 2022     (CN) .......................... 202223368072.0

(51) Int. Cl.
H02K 1/2706 (2022.01)
H02K 19/06 (2006.01)

(52) U.S. Cl.
CPC ........... H02K 1/2706 (2013.01); H02K 19/06 (2013.01)

(58) Field of Classification Search
CPC ...... H02K 1/2706; H02K 1/246; H02K 19/06; H02K 19/103; H02K 19/24; H02K 2213/03
USPC ..................................... 310/216.001, 156.57
See application file for complete search history.

(56) References Cited

U.S. PATENT DOCUMENTS

| | | | |
|---|---|---|---|
| 2006/0043812 A1 | 3/2006 | Cheong et al. | |
| 2012/0187877 A1 | 7/2012 | Yamagiwa et al. | |
| 2014/0021820 A1 | 1/2014 | Kondou et al. | |
| 2019/0245394 A1* | 8/2019 | Takeuchi | F04D 29/007 |
| 2019/0348874 A1* | 11/2019 | Yen | H02K 19/103 |
| 2021/0218298 A1* | 7/2021 | Hu | H02K 1/32 |
| 2022/0166269 A1* | 5/2022 | Chen | H02K 29/03 |

(Continued)

FOREIGN PATENT DOCUMENTS

| | | |
|---|---|---|
| CN | 001741354 A | 3/2006 |
| CN | 102511119 A | 6/2012 |

(Continued)

OTHER PUBLICATIONS

Machine translation of CN-108233569-A. (Year: 2018).*
Machine translation of CN-215120320-U. (Year: 2021).*
Machine translation of FR-3119497-A1. (Year: 2022).*

*Primary Examiner* — Michael Andrews
(74) *Attorney, Agent, or Firm* — Keating &

(57) ABSTRACT

A synchronous reluctance motor includes magnetic barriers in each magnetic barrier group of a rotor core, each having a shape which protrudes toward a radial inner side and is symmetrical about a q-axis. A portion closer to a circumferential side than the q-axis includes a first portion extending perpendicular to the q-axis and a second portion extending farther toward the circumferential side from a circumferential side of the first portion and radially outward, and the first portions of the magnetic barriers in each magnetic barrier group have the same radial dimension. The first portions of the magnetic barriers other than the radial outermost magnetic barrier have the same circumferential dimension, which is the same as or twice a circumferential dimension of the first portion of the radial outermost magnetic barrier.

9 Claims, 6 Drawing Sheets

(56)                References Cited

U.S. PATENT DOCUMENTS

| 2022/0278568 | A1* | 9/2022 | Ibrahim ................. B33Y 10/00 |
| 2022/0294288 | A1 | 9/2022 | Hsu et al. |
| 2022/0407372 | A1 | 12/2022 | Yen et al. |
| 2023/0006588 | A1 | 1/2023 | Shih et al. |

FOREIGN PATENT DOCUMENTS

| CN | 103430430 | A |   | 12/2013 | |
| CN | 108233569 | A | * | 6/2018 | ............. H02K 29/03 |
| CN | 109964393 | A |   | 7/2019 | |
| CN | 112448503 | A |   | 3/2021 | |
| CN | 215120320 | U | * | 12/2021 | |
| FR | 3119497 | A1 | * | 8/2022 | ........... H02K 1/2766 |
| JP | 2023-000053 | A |   | 1/2023 | |
| JP | 2023-006005 | A |   | 1/2023 | |
| JP | 2023-144485 | A |   | 10/2023 | |
| WO | 2022/180871 | A1 |   | 9/2022 | |

* cited by examiner

1

Drehmoment

SYNCHRONOUS RELUCTANCE MOTOR WITH MAGNETIC FLUX BARRIERS

CROSS-REFERENCE TO RELATED APPLICATIONS

The present application claims priority under 35 U.S.C. § 119 to Chinese Patent Application No. 202223368072.0, filed on Dec. 14, 2022, the entire contents of which are hereby incorporated herein by reference.

1. FIELD OF THE INVENTION

The present disclosure relates to synchronous reluctance motors.

2. BACKGROUND

In a synchronous reluctance motor (often referred to as SynRM), a rotor usually has a plurality of poles (two poles, four poles, etc.). A rotor portion of each pole consists of a plurality of magnetic conduction segments and a magnetic barrier, and each pole in the rotor has a position with minimum reluctance (d-axis) and a position with maximum reluctance (q-axis). When a stator winding is energized, the magnetic flux will attempt to pass in a direction where the reluctance in the rotor is minimum, causing the rotor to rotate at a synchronous speed.

In the synchronous reluctance motor, magnets are sometimes disposed in the magnetic barrier, forming a permanent magnet-assisted synchronous reluctance motor (usually referred to as PMA-SynRA), in order to improve the efficiency, etc.

However, in the permanent magnet-assisted synchronous reluctance motor, the magnetic barrier of the rotor is usually formed as an arc shape that protrudes toward a radial inner side to limit an expansion angle between the magnetic barrier and a magnetic conduction segment, thereby reducing the torque ripple. In this case, since arc-shaped magnets can be provided only, it is easy to increase the manufacturing cost and make assembly difficult compared with the case of using rectangular magnets. In addition, the output torque will also be sacrificed since the expansion angle between the magnetic barrier and the magnetic conduction segment is limited.

SUMMARY

An example embodiment of a synchronous reluctance motor of the present disclosure includes a rotor including a rotor core, and a stator surrounding the rotor on a radial outer side, in which the rotor core is provided with a plurality of magnetic barrier groups spaced apart in a circumferential direction, each of the plurality of magnetic barrier groups includes three or more magnetic barriers arranged in a radial direction, and a magnetic conduction segment is provided between every two adjacent magnetic barriers. The plurality of magnetic barriers in each of the magnetic barrier groups each has a shape that protrudes toward a radial inner side and is symmetrical about a q-axis. A portion closer to a circumferential side than the q-axis includes a first portion extending perpendicular to the q-axis, and a second portion extending farther toward the circumferential side from a circumferential side of the first portion and radially outward. The first portions of the plurality of magnetic barriers in each of the magnetic barrier groups have the same radial dimension. Among the plurality of magnetic barriers in each of the magnetic barrier groups, the first portions of the magnetic barriers other than the radial outermost magnetic barrier have the same circumferential dimension, which is the same as or twice a circumferential dimension of the first portion of the radial outermost magnetic barrier.

Here, the so-called "the first portion extending perpendicular to the q-axis" only refers that a radial inner edge of the first portion of the radial outermost magnetic barrier in each magnetic barrier group and radial outer edges and radial inner edges of the first portions of the magnetic barriers other than the radial outermost magnetic barrier may be perpendicular to the q-axis, and the radial outer edge of the first portion of the radial outermost magnetic barrier in each magnetic barrier group may be arc-shaped.

In addition, in a case where the radial outer edge of the radial outermost magnetic barrier in each magnetic barrier group is arc-shaped, a distance between the end of a radial outer edge of the first portion of the radial outermost magnetic barrier on a q-axis side and a radial inner edge of the first portion may be regarded as a radial dimension of the first portion, and a circumferential length of the radial inner edge of the first portion of the radial outermost magnetic barrier may be regarded as a circumferential dimension of the radial outermost magnetic barrier.

According to an example embodiment a of a synchronous reluctance motor of the present disclosure, each of a plurality of magnetic barriers in each magnetic barrier group has a shape which protrudes toward a radial inner side and is symmetrical about the q-axis. A portion closer to a circumferential side than the q-axis includes a first portion extending perpendicular to the q-axis and a second portion extending farther toward the circumferential side from a circumferential side of the first portion and radially outward. Therefore, a rectangular magnet may be located in the first portion of each magnetic barrier while the torque ripple is reduced, thereby simplifying the assembly of the magnet in the magnetic barrier. In addition, the first portions of the plurality of magnetic barriers in each magnetic barrier group have the same radial dimension. Among the plurality of magnetic barriers in each magnetic barrier group, the first portions of the magnetic barriers other than the radial outermost magnetic barrier have a same circumferential dimension, which is the same as or twice the circumferential dimension of the first portion of the radial outermost magnetic barrier, thus improving the output torque.

Furthermore, in an example embodiment of a synchronous reluctance motor of the present disclosure, preferably, for the radial innermost magnetic barrier among the plurality of magnetic barriers in each magnetic barrier group, an angle formed by a connecting line of an end on the circumferential side of a radial outer edge of the first portion and a center of rotation of the rotor with respect to the q-axis is set to α, and an angle formed by a connecting line of an end on the circumferential side of a radial inner edge of the second portion and the center of rotation of the rotor with respect to a d-axis is set to β, and $2.8° < β < 4.6°$ is satisfied.

According to an example embodiment of a synchronous reluctance motor of the present disclosure, $2.8° < β < 4.6°$ is satisfied, thus further improving the output torque.

In addition, according to an example embodiment of a synchronous reluctance motor of the present disclosure, $8.3 < α/β < 8.8$ is satisfied.

According to an example embodiment of a synchronous reluctance motor of the present disclosure, the output torque can be further improved by satisfying $8.3 < α/β < 8.8$.

In addition, in an example embodiment of a synchronous reluctance motor of the present disclosure, preferably for the magnetic barrier of an $n^{th}$ layer from the radial outer side among the plurality of magnetic barriers in each of the magnetic barrier groups, an angle formed by a connecting line of the end on the circumferential side of the radial outer edge of the first portion and the center of rotation of the rotor with respect to the q-axis is set to an, an angle formed by a connecting line of the end on the circumferential side of the radial inner edge of the second portion and the center of rotation of the rotor with respect to the d-axis is set to $\beta$n, and in the case that the plurality of magnetic barrier groups each includes four magnetic barriers, and $\alpha1+\alpha3=\alpha4$ is satisfied.

Here, in the case that a radial outer edge of the radial outermost magnetic barrier in each magnetic barrier group is arc-shaped, an end on the circumferential side of the radial outer edge of the radial outermost magnetic barrier in each magnetic barrier group may be regarded as an end on the circumferential side of the radial outer edge of the first portion.

According to an example embodiment of a synchronous reluctance motor of the present disclosure, in a case where the plurality of magnetic barrier groups each includes four magnetic barriers, the torque ripple can be further reduced by setting the magnetic barriers to satisfy $\alpha1+\alpha3=\alpha4$.

In addition, in an example embodiment of a synchronous reluctance motor of the present disclosure, preferably for the magnetic barrier of the $n^{th}$ layer from the radial outer side among the plurality of magnetic barriers in each of the magnetic barrier groups, an angle formed by a connecting line of an end on the circumferential side of a radial outer edge of the first portion and the center of rotation of the rotor with respect to the q-axis is set to $\alpha$n, an angle formed by a connecting line of an end on the circumferential side of a radial inner edge of the second portion and the center of rotation of the rotor with respect to the d-axis is set to $\beta$n, and in a case that the plurality of magnetic barrier groups each includes four magnetic barriers, $\alpha3=\beta2$ is satisfied.

According to an example embodiment of a synchronous reluctance motor of the present disclosure, in a case where the plurality of magnetic barrier groups each includes four magnetic barriers, the torque ripple can be further reduced by setting the magnetic barriers to satisfy $\alpha3=\beta2$.

In addition, in an example embodiment of a synchronous reluctance motor of the present disclosure, preferably for the magnetic barrier of the $n^{th}$ layer from the radial outer side among the plurality of magnetic barriers in each of the magnetic barrier groups, an angle formed by a connecting line of the end on the circumferential side of the radial outer edge of the first portion and the center of rotation of the rotor with respect to the q-axis is set to $\alpha$n, an angle formed by the connecting line of the end on the circumferential side of the radial inner edge of the second portion and the center of rotation of the rotor with respect to the d-axis is set to $\beta$n, and in the case that the plurality of magnetic barrier groups each includes four magnetic barriers, $0.212<\alpha1/\beta2<0.225$ is satisfied.

According to an example embodiment of a synchronous reluctance motor of the present disclosure, in a case where the plurality of magnetic barrier groups each includes four magnetic barriers, the torque ripple can be further reduced by setting the magnetic barriers to satisfy $0.212<\alpha1/\beta2<0.225$.

In addition, in an example embodiment of a synchronous reluctance motor of the present disclosure, preferably for the magnetic barrier of the $n^{th}$ layer from the radial outer side among the plurality of magnetic barriers in each of the magnetic barrier groups, an angle formed by a connecting line of the end on the circumferential side of the radial outer edge of the first portion and the center of rotation of the rotor with respect to the q-axis is set to $\alpha$n, an angle formed by a connecting line of the end on the circumferential side of the radial inner edge of the second portion and the center of rotation of the rotor with respect to the d-axis is set to $\beta$n; and in the case that the plurality of magnetic barrier groups each includes four magnetic barriers, $1.7<<\alpha3/\beta3<1.75$ is satisfied.

According to an example embodiment of a synchronous reluctance motor of the present disclosure, in the case that the plurality of magnetic barrier groups each includes four magnetic barriers, the torque ripple can be further reduced by setting the magnetic barriers to satisfy $1.7<<\alpha3/\beta3<1.75$.

In addition, in an example embodiment of a synchronous reluctance motor of the present disclosure, preferably, conductors are located in at least a portion of the plurality of magnetic barriers in each of the magnetic barrier groups.

In addition, in an example embodiment of a synchronous reluctance motor of the present disclosure, preferably, magnets are located in the first portions, and/or, conductors are located at least in the second portion of the first portion and the second portion.

In addition, in an example embodiment of a synchronous reluctance motor of the present disclosure, preferably among the plurality of magnetic barriers in each of the magnetic barrier groups, the second portions of the magnetic barriers other than the radial outermost magnetic barrier bend and extend toward a circumferential side from the first portions.

In addition, in an example embodiment of a synchronous reluctance motor of the present disclosure, preferably among the plurality of magnetic barriers in each of the magnetic barrier groups, the first portions of the magnetic barriers other than the radial outermost magnetic barrier are rectangular when viewed in an axial direction.

The above and other elements, features, steps, characteristics and advantages of the present disclosure will become more apparent from the following detailed description of the example embodiments with reference to the attached drawings.

DETAILED DESCRIPTION

Figure 1:
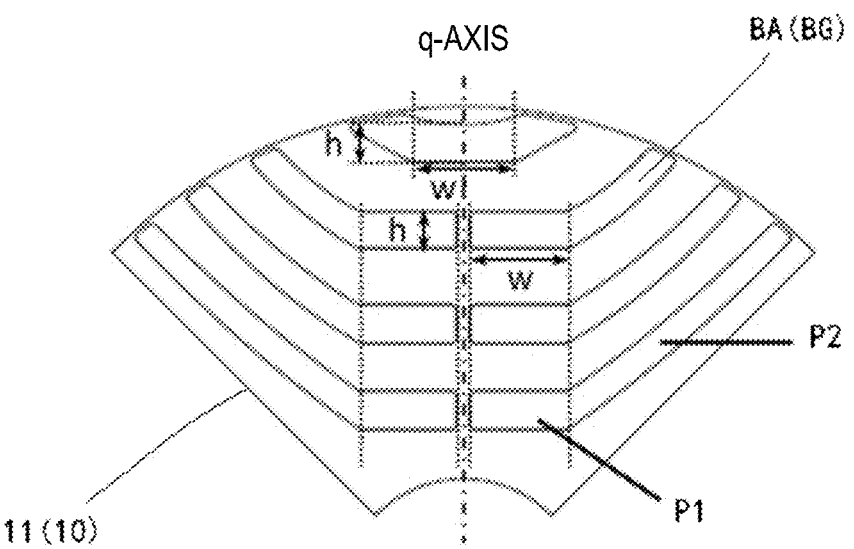
FIG. 1 is a partial cross-sectional view schematically showing a rotor of a synchronous reluctance motor according to an example embodiment of the present disclosure.
Figure 2:
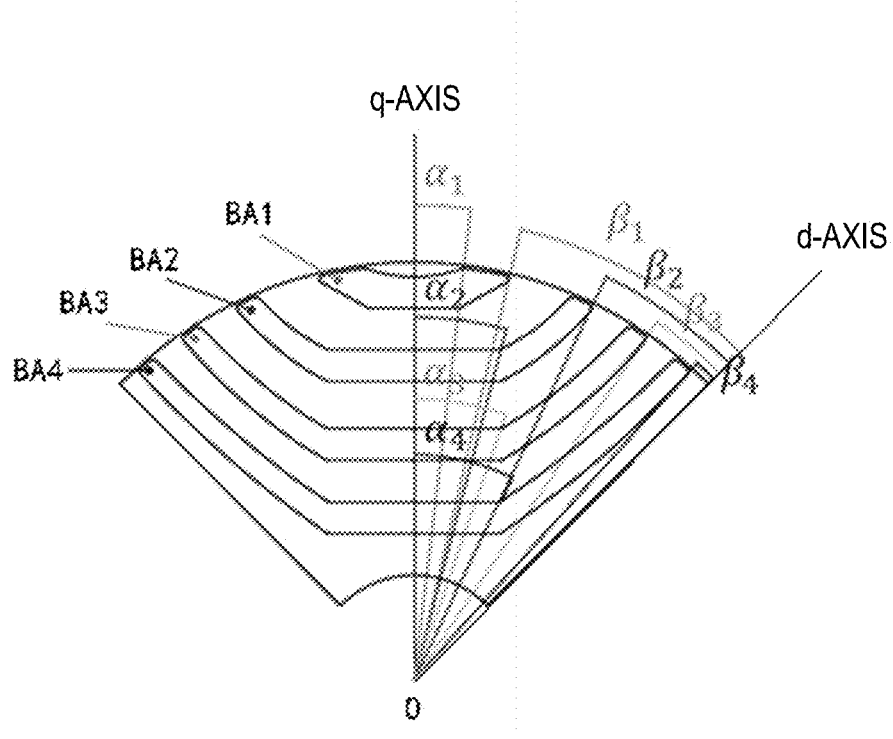
FIG. 2 is an illustration diagram schematically showing structural parameters of a rotor of a synchronous reluctance motor according to an example embodiment of the present disclosure.
Figure 3A:
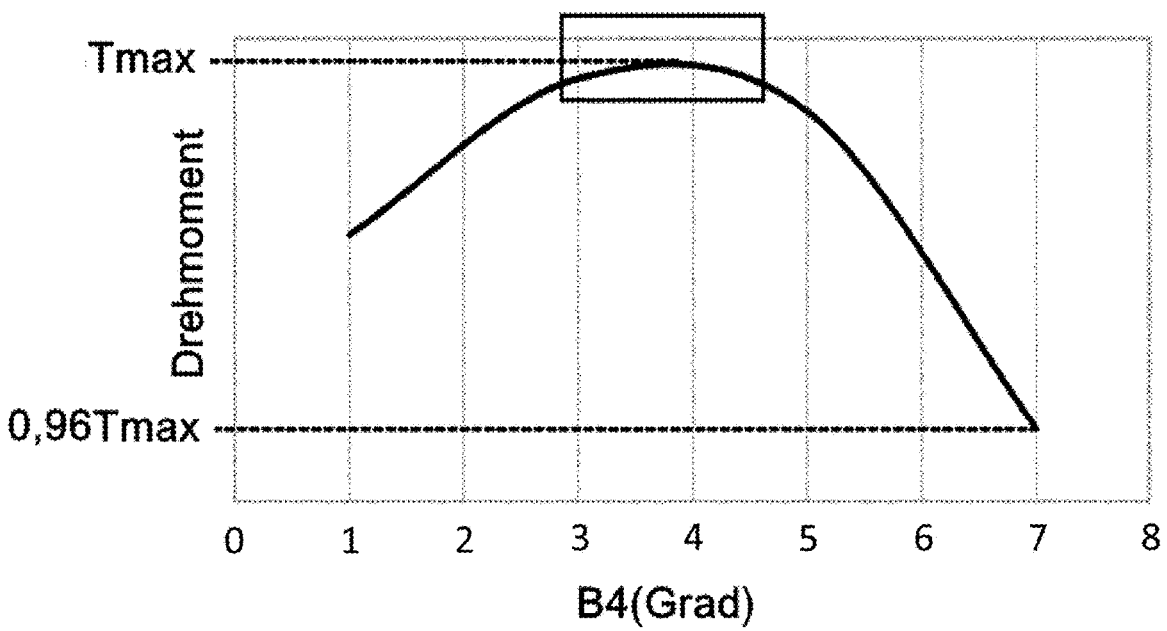
FIG. 3A is a graph schematically showing a relationship between $\beta$ formed by a radial innermost magnetic barrier of a rotor of a synchronous reluctance motor and an output torque according to an example embodiment of the present disclosure.
Figure 3B:
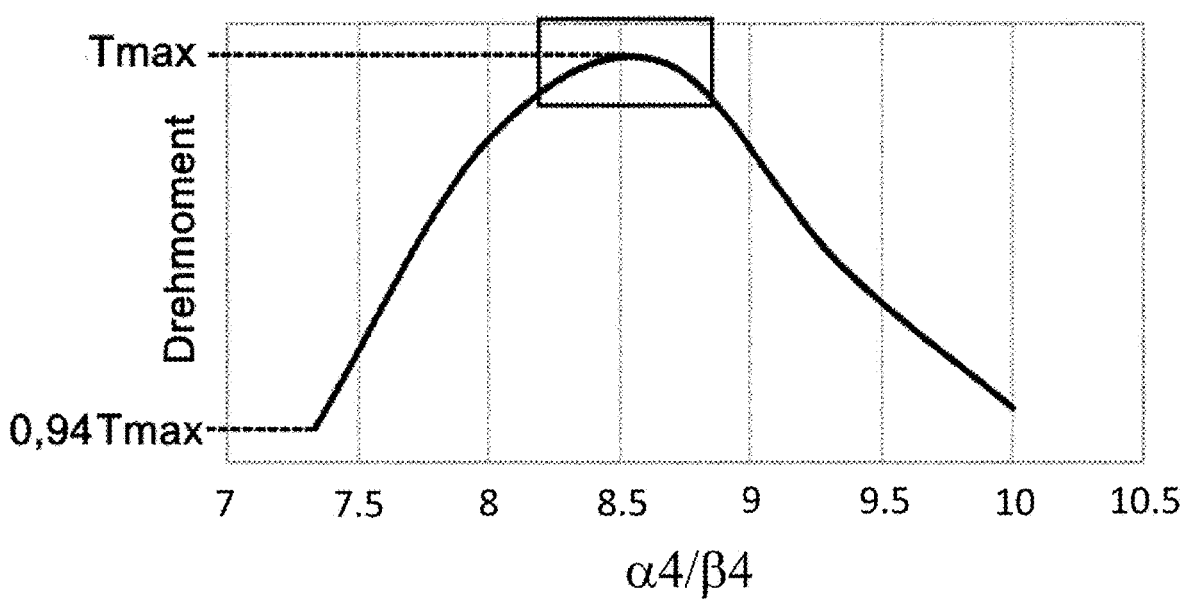
FIG. 3B is a graph schematically showing a relationship between $\alpha/\beta$ formed by a radial innermost magnetic barrier of a rotor of a synchronous reluctance motor and an output torque according to an example embodiment of the present disclosure.
Figure 4:
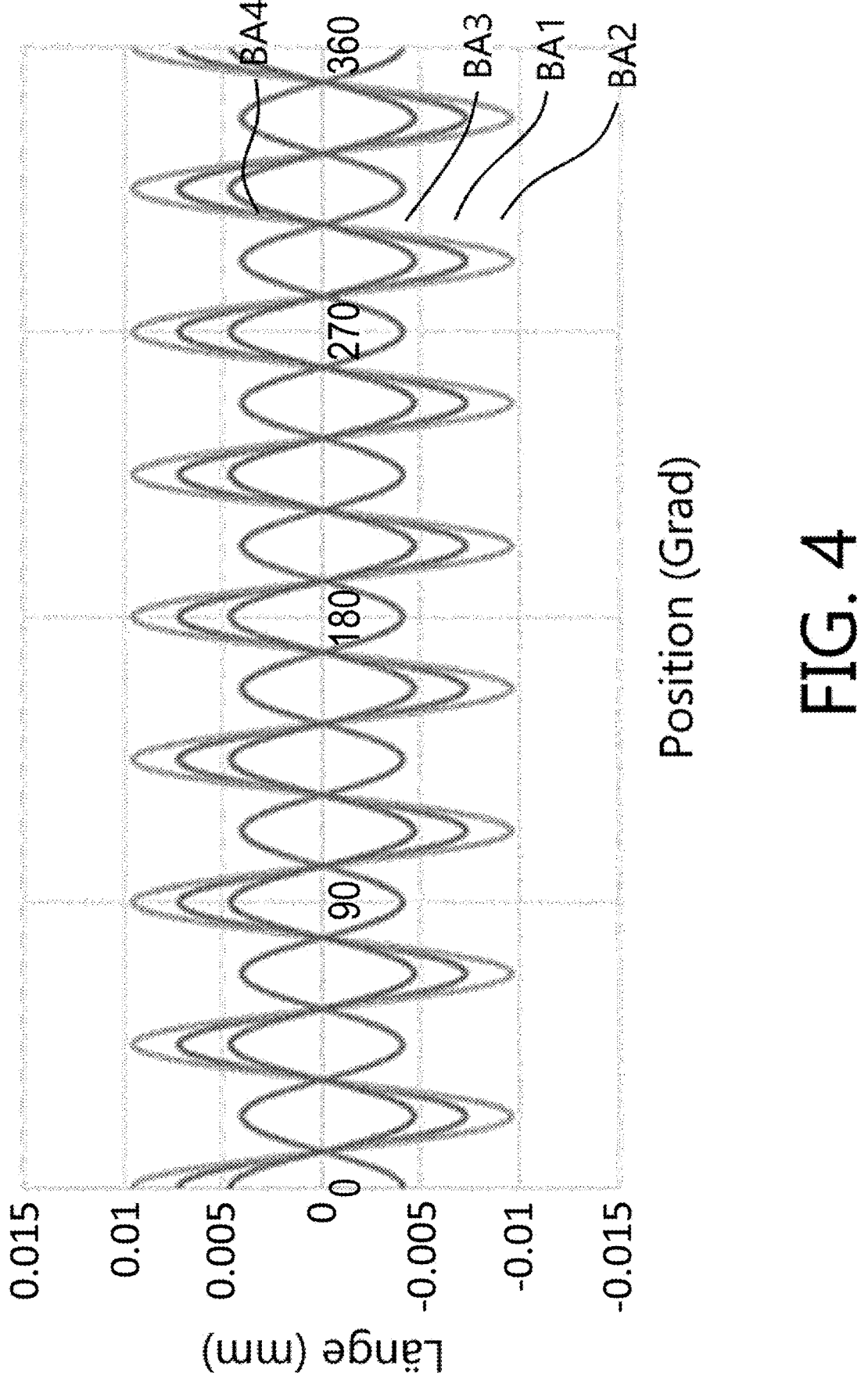
FIG. 4 is an illustration diagram schematically showing a relationship between fundamental wave peak periods of a plurality of magnetic barriers in each magnetic barrier group of the rotor of the synchronous reluctance motor according to an example embodiment of the present disclosure.

Next, a synchronous reluctance motor according to an example embodiment of the present disclosure will be described with reference to FIGS. 1 to 4, in which FIG. 1 is a partial cross-sectional view schematically showing a rotor of a synchronous reluctance motor according to an example embodiment of the present disclosure, FIG. 2 is an illustration diagram schematically showing structural parameters of a rotor of a synchronous reluctance motor according to an example embodiment of the present disclosure, FIG. 3A is a graph schematically showing a relationship between $\beta$ formed by a radial innermost magnetic barrier of a rotor of a synchronous reluctance motor and an output torque according to an example embodiment of the present disclosure, FIG. 3B is a graph schematically showing a relationship between $\alpha/\beta$ formed by a radial innermost magnetic barrier of a rotor of a synchronous reluctance motor and an output torque according to an example embodiment of the present disclosure, and FIG. 4 is an illustration diagram schematically showing a relationship between fundamental wave peak periods of a plurality of magnetic barriers in each magnetic barrier group of a rotor of a synchronous reluctance motor according to an example embodiment of the present disclosure.

As shown in FIG. 1, the synchronous reluctance motor 1 includes a rotor 10 including a rotor core 11, and a stator (not shown) surrounding the rotor 10 radially on the outer side. The rotor core 11 is provided with three or more magnetic barrier groups BG which are spaced apart in a circumferential direction (in the example shown in FIG. 1, there are a total of four magnetic barrier groups, that is, the rotor has four poles, which are, however, not limited thereto). The plurality of magnetic barrier groups BG each includes a plurality of magnetic barriers BA arranged in a radial direction (in the example shown in FIG. 1, a magnetic barrier BA1, a magnetic barrier BA2, a magnetic barrier BA3 and a magnetic barrier BA4 are arranged in order from a radial outer side to a radial inner side, and respectively include gaps). A magnetic conduction segment is provided between every two adjacent magnetic barriers BA.

As shown in FIG. 1, the rotor 10 includes a rotor core 11 including iron core sheets laminated in an axial direction. Furthermore, the rotor 10 further includes a rotating shaft (not shown) that penetrates through a through hole in the center of the rotor core 11 in the axial direction.

In addition, as shown in FIG. 1, in the rotor core 11, the plurality of magnetic barriers BA in each magnetic barrier group BG each has a shape that protrudes toward a radial inner side and is symmetrical about the q-axis, and a portion closer to a circumferential side than the q-axis includes a first portion P1 extending perpendicular to the q-axis and a second portion P2 extending farther toward the circumferential side from a circumferential side of the first portion P1 and radially outward.

In addition, as shown in FIG. 1, the first portions P1 of the plurality of magnetic barriers BA in each magnetic barrier group BG have the same radial directions h. Furthermore, among the plurality of magnetic barriers BA in each magnetic barrier group BG, the first portions P1 of the magnetic barriers other than the radial outermost magnetic barrier have the same circumferential dimension w, which is twice a circumferential dimension of the first portion P1 of the radial outermost magnetic barrier.

In addition, as shown in FIG. 1, among the plurality of magnetic barriers BA in each magnetic barrier group BG, the first portions P1 of the magnetic barriers other than the radial outermost magnetic barrier are rectangular respectively when viewed in an axial direction (in the example shown in FIG. 1, the circumferential ends of the first portions P1 of these magnetic barriers are aligned with each other), in which a radial outer edge and a radial inner edge are straight lines perpendicular to the q-axis respectively, and the first portion P1 of the radial outermost magnetic barrier is approximately rectangular when viewed in the axial direction (in the example shown in FIG. 1, the circumferential end of the first portion P1 of this magnetic barrier is closer to the q-axis than the circumferential ends of the first portions P1 of other magnetic barriers), in which a radial outer edge is an arc line, and a radial inner edge is a straight line perpendicular to the q-axis.

In addition, as shown in FIG. 1, among the plurality of magnetic barriers BA in each magnetic barrier group BG, the second portions P2 of the magnetic barriers other than the radial outermost magnetic barrier bend and extend toward a circumference side from the first portions P1. Specifically, among the plurality of magnetic barriers BA in each magnetic barrier group BG, a radial outer edge and a radial inner edge of each of the second portions P2 of the magnetic barriers other than the radial outermost magnetic barrier are arc lines when viewed in the axial direction, respectively. Furthermore, a radial outer edge of the first portion P1 of the radial outermost magnetic barrier is an arc line and a radial inner edge thereof is a straight line, when viewed in the axial direction.

Furthermore, as shown in FIG. 1, among the plurality of magnetic barriers BA in each magnetic barrier group BG, the radial outermost magnetic barrier extends continuously, and the magnetic barriers except for the radial outermost magnetic barrier are disconnected at the q-axis (that is, their first portions P1 are spaced apart from the q-axis).

Furthermore, as shown in FIG. 2, for the radial innermost magnetic barrier among the plurality of magnetic barriers in each magnetic barrier group BG, an angle formed by a connecting line of an end on the circumferential side of a radial outer edge of the first portion P1 and the center O of rotation of the rotor 10 with respect to the q-axis is set to $\alpha$ ($\alpha4$, in the example shown in FIG. 2); an angle formed by a connecting line of the end on the circumferential side of a radial inner edge of the second portion P2 and the center O of rotation of the rotor 10 with respect to a d-axis is set to $\beta$ ($\beta4$, in the example shown in FIG. 2), and the following relationship is satisfied: $2.8° < \beta < 4.6°$, and preferably $8.3 < \alpha/\beta < 8.8$ is satisfied at the same time.

In addition, as shown in FIG. 2, for the magnetic barrier of the $n^{th}$ layer from the radial outer side among the plurality of magnetic barriers in each magnetic barrier groups BG, an angle formed by a connecting line of the end on the circumferential side of the radial outer side of the first portion P1 and the center O of rotation of the rotor 10 with respect to the q-axis is set to $\alpha n$; an angle formed by the connecting line of the end on the circumferential side of the radial inner edge of the second portion P2 and the center O of rotation of the rotor 10 with respect to the d-axis is set to $\beta n$; and when the plurality of magnetic barrier groups each includes four magnetic barriers BA, at least one of the following relationships 1) to 4) is preferably satisfied.

Relationship 1): $\alpha 1 + \alpha 3 = \alpha 4$

Relationship 2): $\alpha 3 = \beta 2$

Relationship 3): $0.212 < \alpha 1/\beta 2 < 0.225$

Relationship 4): $1.7 << \alpha 3/\beta 3 < 1.75$

Although not shown in the figures, the stator includes a stator core and a coil wound around the stator core.

In addition, the stator core includes a core back and pole teeth. The core back is annular, and the pole teeth extend radially inward from the core back. There are a plurality of pole teeth arranged at equal intervals in a circumferential direction. A groove that opens toward a radial inner side is formed between the circumferentially adjacent pole teeth, and the radial inner ends of the pole teeth are opposite to and spaced apart from an outer circumferential surface of the rotor by a gap. Furthermore, the coil is wound around the pole teeth and inserted into the groove formed between circumferentially adjacent pole teeth.

According to the synchronous reluctance motor 1 in this example embodiment, the plurality of magnetic barriers BA in each magnetic barrier group BG each has a shape that protrudes toward a radial inner side and is symmetrical about the q-axis, and a portion closer to a circumferential side than the q-axis includes a first portion P1 extending perpendicular to the q-axis and a second portion P2 extending farther toward the circumferential side from a circumferential side of the first portion P1 and radially outward. Therefore, rectangular magnets are disposed in the first portions P1 of the magnetic barriers BA while the torque ripple is reduced, thereby simplifying the assembly of the magnets in the magnetic barriers BA.

Furthermore, according to the synchronous reluctance motor 1 in this example embodiment, the first portions P1 of the plurality of magnetic barriers BA in each magnetic barrier group BG have the same radial dimension, and among the plurality of magnetic barriers BA in each magnetic barrier group BG, the first portions P1 of the magnetic barriers other than the radial outermost magnetic barrier BA have the same circumferential dimension, which is twice the circumferential dimension of the first portion P1 of the radial outermost magnetic barrier BA, thereby contributing to improve the output torque.

Furthermore, according to the synchronous reluctance motor 1 in this example embodiment, for the radial innermost magnetic barrier among the plurality of magnetic barriers BA in each magnetic barrier group BG, an angle formed by a connecting line of an end on the circumferential side of a radial outer edge of the first portion P1 and the center O of rotation of the rotor 10 with respect to the q-axis is set to $\alpha$; an angle formed by a connecting line of an end on the circumferential side of a radial inner edge of the second portion P2 and the center O of rotation of the rotor 10 with respect to the d-axis is set to $\beta$; and the following relationships are satisfied: $2.8° < \beta < 4.6°$, and $8.3 < \alpha/\beta < 8.8$. Therefore, as shown in FIG. 3A and FIG. 3B, the output torque is further improved. Specifically, as shown in FIG. 4, by separating magnetic permeability functions of the plurality of magnetic barriers BA in each magnetic barrier group BG, it can be seen that a fundamental wave peak period of the radial innermost magnetic barrier BA (specifically, the magnetic barrier BA4) is opposite to fundamental wave peak periods of other magnetic barriers (specifically, the magnetic barrier BA1, the magnetic barrier BA2, and the magnetic barrier BA3). However, by setting the radial innermost magnetic barrier among the plurality of magnetic barriers BA in each magnetic barrier group BG to satisfy $2.8° < \beta < 4.6°$ and $8.3 < \alpha/\beta < 8.8$, a fundamental wave amplitude of the magnetic permeability function of the radial innermost magnetic barrier BA in each magnetic barrier group BG can be minimized. From the following formula representing a relationship between the fundamental wave amplitude of the magnetic permeability function and the torque, it can be seen that the torque is directly proportional to a fundamental wave peak of the magnetic permeability function, and the smaller the fundamental wave peak of the magnetic permeability function, the smaller the torque. Therefore, the torque formed by the radial innermost magnetic barrier BA in each magnetic barrier group BG can be minimized, so that the total reluctance torque of the synchronous reluctance motor 1 can be increased.

$$T_{el} = \left(\frac{P}{2}\right)\left(\frac{1}{2}\right)(Ks^{-1}i_{qd0s})' \left[\frac{\partial}{\partial \theta_r}\left(\frac{\int N_{is}(\varphi_s) \int \frac{MMF_{js(\varphi x)}}{g_\lambda(\varphi_r)} rl}{i_{is}} - L_{is}l\right)\right]$$

$$(Ks^{-1}i_{qd0s}) = \left(\frac{P}{2}\right)\frac{g}{4}A_1\alpha_1 i_{qs}i_{ds}$$

In the above formula, P is the number of poles; $Ks^{-1}$ is an inverse matrix of Park's Transformation; $i_{qd0s}$ is current matrices of a q-axis, a d-axis and an 0-axis on the stator side; $\theta_r$ is a rotor position; $N_{is}(\varphi_s)$ is a stator winding distribution function per phase; $MMF_{is}(\varphi_s)$ is a magnetomotive force of the stator per phase; $1/g (\varphi r)$ is a magnetic permeability function (i.e., a reciprocal of a reluctance function) of the rotor; r is an average value between a stator inner diameter and a rotor outer diameter; l is a lamination thickness of the motor; $i_{is}$ is a stator current per phase; $L_{is}$ is a leakage inductance of the stator; I is a stator current; and $\alpha_1$ is a fundamental wave peak value of the magnetic permeability function of the rotor.

The present disclosure has been exemplarily described above in conjunction with the accompanying drawings. However, specific implementations of the present disclosure is not limited by the above-mentioned example embodiments.

For example, in the above-mentioned example embodiments, in each magnetic barrier group BG, the magnetic barriers of each layer may be formed continuously or intermittently.

Furthermore, in the above example embodiments, among the plurality of magnetic barriers BA in each magnetic barrier group BG, the first portions P1 of the plurality of magnetic barriers other than the radial outermost magnetic barrier have the same circumferential dimension, which is twice the circumferential dimension of the first portion P1 of the radial outermost magnetic barrier, which is, however, limited thereto. Alternatively, the first portions P1 of all the magnetic barriers BA in each magnetic barrier group BG are set to have the same circumferential dimension.

Furthermore, in the above example embodiments, among the plurality of magnetic barriers BA in each magnetic barrier group BG, the radial outer edge of the first portion P1 of the radial outermost magnetic barrier is an arc line, but is not limited thereto. Here, it may be formed as a straight line perpendicular to the q-axis.

Furthermore, in the above example embodiments, the second portions P2 of all the magnetic barriers BA in each magnetic barrier group BG may be formed into a linear shape when viewed in an axial direction.

Figure 5:
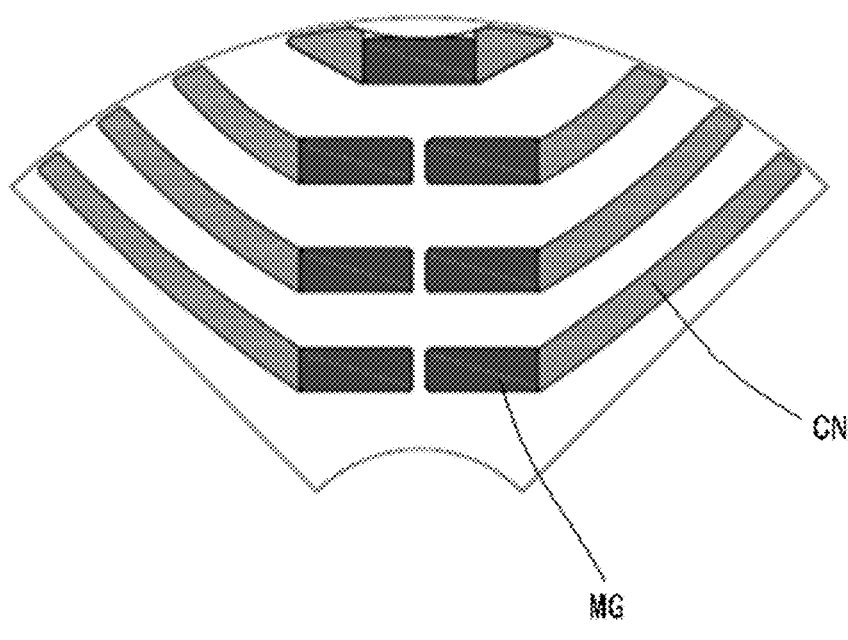
FIG. 5 is a partial cross-sectional view schematically showing a rotor of a synchronous reluctance motor according to a variation example of the present disclosure.
Figure 6:
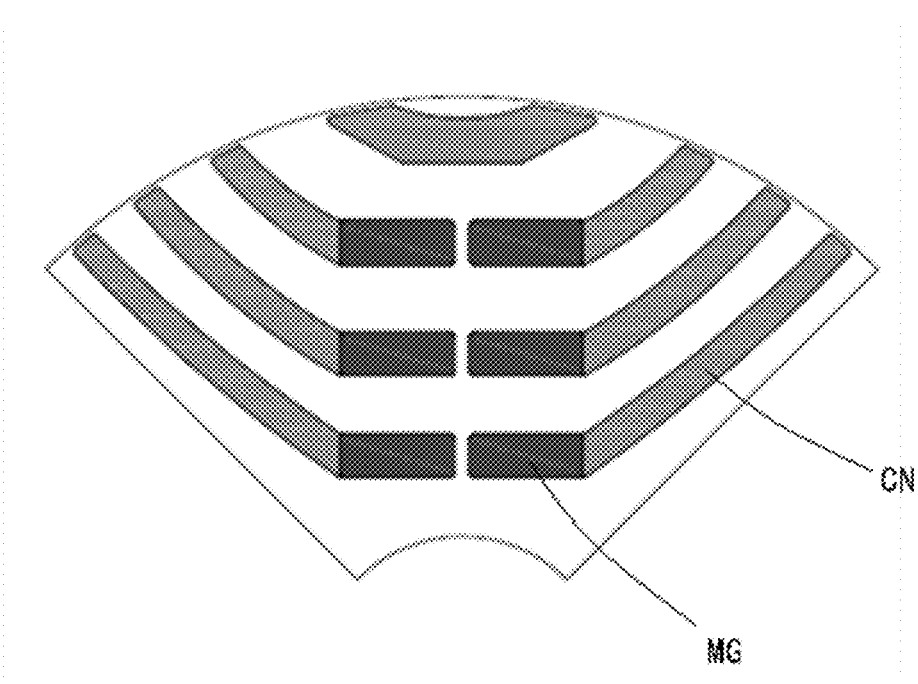
FIG. 6 is a partial cross-sectional view schematically showing a rotor of a synchronous reluctance motor according to another variation example of the present disclosure.

In addition, in the above example embodiments, magnets and/or conductors may be conveniently disposed in the plurality of magnetic barriers BA in each magnetic barrier group BG as needed. For example, as shown in FIG. 5, magnets MG are disposed in the first portions P1 of all the magnetic barriers BA in each magnetic barrier group BG, and conductors CN (e.g., aluminum or copper) are disposed in the second portions P2 of all the magnetic barriers BA in each magnetic barrier group BG. Alternatively, also shown in FIG. 6, among the plurality of magnetic barriers BA in each magnetic barrier group BG, magnets MG are disposed in the first portions P1 of all the magnetic barriers BA except for the radial outermost magnetic barrier, a conductor CN is disposed in the first portion P1 of the radial outermost magnetic barrier, and conductors CN are disposed in the second portions P2 of all the magnetic barriers. Of course, conductors may also be disposed in the first portions P1 and the second portions P2 of all the magnetic barriers BA in each magnetic barrier group BG.

It should be understood that within the scope of the present disclosure, various elements, features, portions, etc., in the example embodiments can be freely combined, or various elements, features, portions, etc., in the example embodiments can be appropriately modified or omitted.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A synchronous reluctance motor, comprising:
a rotor including a rotor core; and
a stator surrounding the rotor on a radial outer side; wherein
the rotor core is provided with a plurality of magnetic barrier groups spaced apart in a circumferential direction;
each of the plurality of magnetic barrier groups includes three or more magnetic barriers arranged in a radial direction, and a magnetic conduction segment is provided between every two adjacent magnetic barriers;
the plurality of magnetic barriers in each of the magnetic barrier groups each has a shape that protrudes toward a radial inner side and is symmetrical about a q-axis, and a portion closer to a circumferential side than the q-axis includes a first portion extending perpendicular to the q-axis, and a second portion extending farther toward the circumferential side from a circumferential side of the first portion and radially outward;
the first portions of the plurality of magnetic barriers in each magnetic barrier group have a same radial dimension;
among the plurality of magnetic barriers in each magnetic barrier group, the first portions of the magnetic barriers other than the radial outermost magnetic barrier have a same circumferential dimension, which is the same as or twice a circumferential dimension of the first portion of the radial outermost magnetic barrier; and
for a radial innermost magnetic barrier among the plurality of magnetic barriers in each magnetic barrier group, an angle formed by a connecting line of an end on the circumferential side of a radial outer edge of the first portion and a center of rotation of the rotor with respect to the q-axis is set to, and an angle formed by a connecting line of an end on the circumferential side of a radial inner edge of the second portion and the center of rotation of the rotor with respect to a d-axis is set to $\beta$, and $2.8° < \beta < 4.6°$ is satisfied.

2. The synchronous reluctance motor according to claim 1, wherein $8.3 < \alpha/\beta < 8.8$ is satisfied.

3. The synchronous reluctance motor according to claim 1, wherein
for the magnetic barrier of an nth layer from the radial outer side among the plurality of magnetic barriers in each of the magnetic barrier groups, an angle formed by a connecting line of the end on the circumferential side of the radial outer edge of the first portion and the center of rotation of the rotor with respect to the q-axis is set to $\alpha n$, an angle formed by a connecting line of the end on the circumferential side of the radial inner side of the second portion and the center of rotation of the rotor with respect to the d-axis is set to $\beta n$; and
in the case that the plurality of magnetic barrier groups each includes four magnetic barriers, $\alpha 1 + \alpha 3 = \alpha 4$ is satisfied.

4. The synchronous reluctance motor according to claim 1, wherein for the magnetic barrier of the $n^{th}$ layer from the radial outer side among the plurality of magnetic barriers in each of the magnetic barrier groups, an angle formed by a connecting line of the end on the circumferential side of the radial outer edge of the first portion and the center of rotation of the rotor with respect to the q-axis is set to $\alpha n$, an angle formed by a connecting line of the end on the circumferential side of the radial inner edge of the second portion and the center of rotation of the rotor with respect to the d-axis is set to $\beta n$; and
in the case that the plurality of magnetic barrier groups each includes four magnetic barriers, $\alpha 3 = \beta 2$ is satisfied.

5. The synchronous reluctance motor according to claim 1, wherein
for the magnetic barrier of the $n^{th}$ layer from the radial outer side among the plurality of magnetic barriers in each of the magnetic barrier groups, an angle formed by a connecting line of the end on the circumferential side of the radial outer edge of the first portion and the center of rotation of the rotor with respect to the q-axis is set to $\alpha n$, an angle formed by a connecting line of the end on the circumferential side of the radial inner edge of the second portion and the center of rotation of the rotor with respect to the d-axis is set to $\beta n$; and
in the case that the plurality of magnetic barrier groups each includes four magnetic barriers, $0.212 < \alpha 1/\beta 2 < 0.225$ is satisfied.

6. The synchronous reluctance motor according to claim 1, wherein
for the magnetic barrier of the $n^{th}$ layer from the radial outer side among the plurality of magnetic barriers in each of the magnetic barrier groups, an angle formed by a connecting line of the end on the circumferential side of the radial outer edge of the first portion and the center of rotation of the rotor with respect to the q-axis is set to $\alpha n$, an angle formed by a connecting line of the end on the circumferential side of the radial inner edge of the second portion and the center of rotation of the rotor with respect to the d-axis is set to $\beta n$; and in the case that the plurality of magnetic barrier groups each includes four magnetic barriers, $1.7 < \alpha 3/\beta 3 < 1.75$ is satisfied.

7. The synchronous reluctance motor according to claim 1, wherein conductors are located in at least a portion of the plurality of magnetic barriers in each of the magnetic barrier groups.

8. The synchronous reluctance motor according to claim 1, wherein magnets are located in the first portion; and/or conductors are located in the second portion.

9. The synchronous reluctance motor according to claim 1, wherein among the plurality of magnetic barriers in each of the magnetic barrier groups, the second portions of the magnetic barriers other than the radial outermost magnetic barrier bend and extend toward a circumferential side from the first portions.

* * * * *